United States Patent Office 2,703,292
Patented Mar. 1, 1955

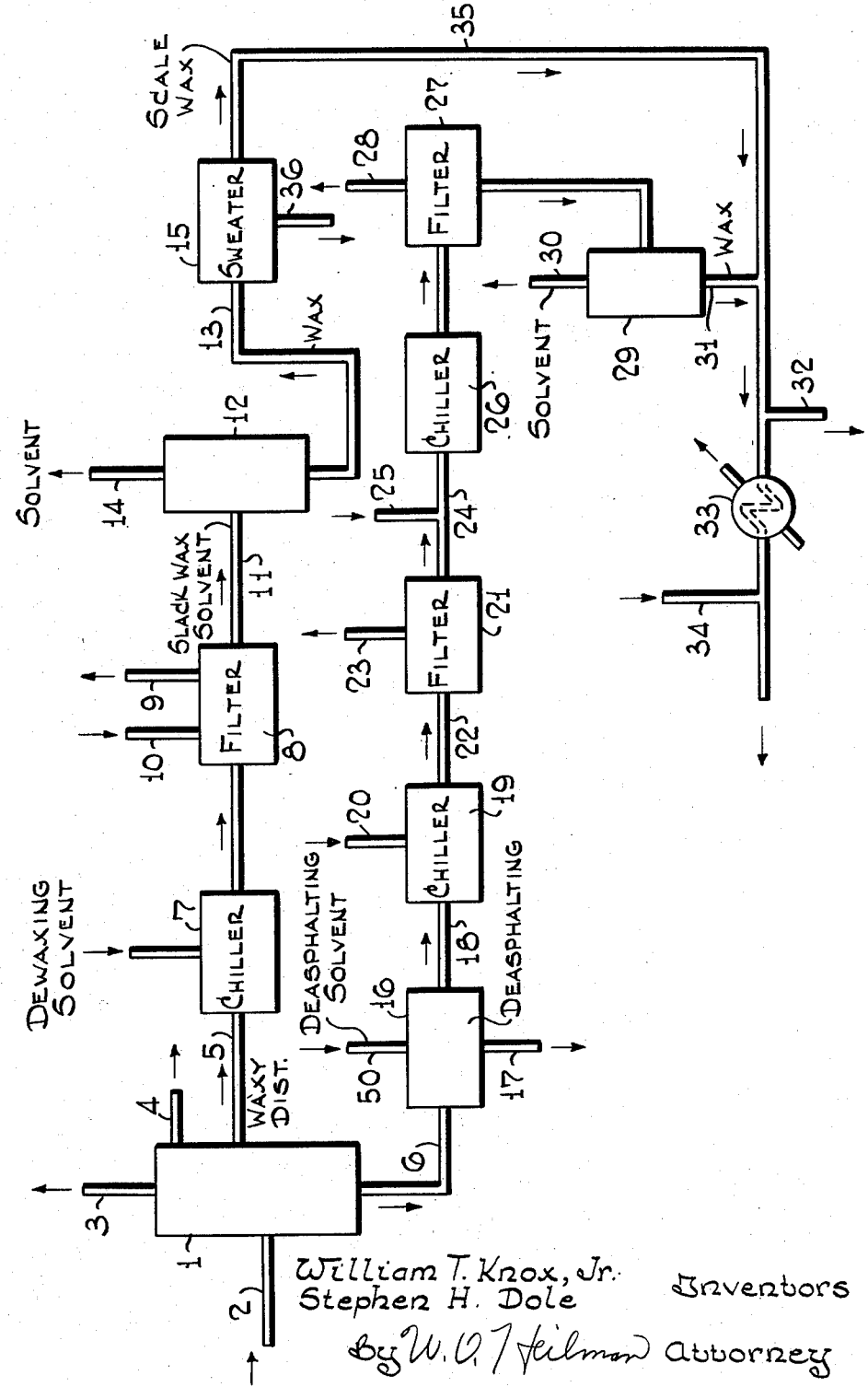

2,703,292

FIBROUS WAX COMPOSITION IMPERVIOUS TO FLUIDS

William T. Knox, Jr., Cranford, and Stephen H. Dole, Orange, N. J., assignors to Esso Research and Engineering Company, a corporation of Delaware Application December 20, 1951, Serial No. 262,640

1 Claim. (Cl. 106—270)

This invention relates to the production of a petroleum hydrocarbon wax composition of enhanced plastic properties suitable as a coating agent and for other purposes by blending a small proportion of petrolatum or microcrystalline wax with scale wax. The invention is more particularly concerned with the production of a material impervious to fluid comprising a fibrous material coated or impregnated with a wax composition containing a critical amount of microcrystalline wax. The present application is a continuation-in-part of U. S. Serial No. 123,801, filed October 26, 1949, for William T. Knox, Jr., and Stephen H. Dole, entitled "Wax Composition."

In the refining of hydrocarbon oils such as petroleum oils, it is known to segregate paraffin waxes from so-called paraffin distillates, waxy lubes and the like. The segregation of these waxes is secured by a number of processes. For example, it is known to chill the selected wax containing fraction in order to secure crystallization of the wax and to remove the wax crystals from the oil by filtering, centrifuging and the like. It is also known to use various dewaxing solvents such as liquid normally gaseous hydrocarbons, such as propane, as well as other solvents, such as methyl-ethyl ketone and the like. It is also known to utilize in dewaxing operations solvent mixtures wherein one solvent comprises a wax precipitating solvent while the other comprises a solvent having a high solubility for oil. A solvent mixture of this character, for example, comprises 60% by volume of toluene and 40% by volume of methyl-ethyl ketone. In utilizing a mixture of this character, it has been the practice to add the mixture in toto or incrementally to the waxy distillate as it is being chilled. In dewaxing operations, it is also known to use various filter aids and other agents in order to render the dewaxing and filtering operations more efficient.

The wax segregated from the hydrocarbon oil, usually termed "slack wax," contains from about 10% to 40% of oil. The slack wax is refined usually by conventional sweating to produce "crude scale wax" in a manner to reduce the oil content to less than about 5% by weight. The slack wax may be distilled to obtain the desired boiling range wax prior to sweating, if desired. This "crude scale wax" generally has an oil content of about 2% to 3% by weight. In order to remove this oil from the scale wax to produce a refined wax having an oil content below about .5%, usually below about .3%, various procedures have been proposed and employed.

It is also known in the art to segregate microcrystalline waxes from residual oils. These microcrystalline waxes are of a relatively high melting point and of different crystalline structure. The microcrystalline or petrolatum waxes may be prepared from any of the paraffin or mixed base crude oils. The undistilled residue may be treated with sulfuric acid and neutralized to remove the tarry matter and unsaturated hydrocarbons. The undistilled residue also may be deasphalted. The treated stock, containing a fairly high percentage of wax, as evidenced by a very high pour point, may be dewaxed by blending with a dewaxing solvent, such as propane, methyl ethyl ketone-benzol, or petroleum naphtha and chilled, and filtered or centrifuged to separate the petrolatum wax from the oil solution.

This deoiling operation produces a wax containing some oil and solvent. The wax after removal of the solvent has a melting point of from about 140° to 180° F.

The wax may be again put in solution with more solvent or naphtha and chilled and filtered or recentrifuged to further reduce the oil content. The wax which separates in either of these operations is referred to as crude petrolatum wax. The wax separated in the second deoiling process after stripping to remove solvent is fairly dry and of a low oil content. This wax should not be confused with petroleum jellies which contain large amounts of oil. The crude petrolatum wax may be again put into solution with naphtha and filtered through clay or an equivalent material in order to improve its color. The clay filtered solution is distilled to remove the naphtha, the residue being a refined petrolatum wax having a melting point within the range of about 140° to 180° F. The source of the crude oil and the oil content of the refined microcrystalline product will affect the melting point of the final wax product. The refined petrolatum wax, sometimes called amorphous wax, is of very small crystal structure.

The hereinbefore mentioned crude petrolatum wax may be fractionated into petrolatum waxes having melting points within the range of 140° F. to 180° F. Usually this separation is effected by fractional precipitation from ketone, propane or naphtha solutions. The terms "petrolatum waxes" or "microcrystalline waxes" are used in this application to cover the residual type petroleum waxes of very small crystalline structure, and having melting points above about 145° F. and oil contents in the range of about 1 to 10%.

Paraffin type waxes have been extensively used in the coating art, particularly where liquid proofness and moisture proofness have been desired. However, paraffin wax, while inexpensive, has certain disadvantages. During sweating the "soft" waxes usually considered to be isoparaffins or naphthenic compounds are dissolved out by the sweated oil, and are thus lost from the refined wax. For certain uses in the coating field, such as in the liquid proofing of milk cartons, the presence of these soft waxes is desirable as they exert a plasticizing effect and prevent the coating from cracking. Scale wax still contains an appreciable quantity of these "soft" waxes but is too unctuous in nature to be preferred as a coating material and possesses a mottled appearance.

Flexibility and impact strength are very important indexes to the suitability of waxes as coating and impregnating materials. High flexibility has been found to be related to good performance of waxes as coating materials at low temperatures. High impact strength, i. e., high resistance to deformation or cracking on impact, is related to the ability of the wax to withstand rough handling and chipping.

It has now been discovered that the flexibility and impact strength of scale wax coatings can be greatly increased by blending with these scale waxes small amounts of microcrystalline wax. It is preferred that the scale waxes contain more than about 1% oil, preferably from about 2 to 4% of oil. The microcrystalline wax is added in amounts from 1% to 20%, preferably from about 7 to 12%, based on the total wax composition. The crude scale-microcrystalline wax blends have a fine uniform texture when solidified and are not unctuous. As pointed out, a particularly desirable concentration of microcrystalline wax to be utilized in accordance with the present invention is in the range of about 7 to 12%.

Also as mentioned heretofore, the invention is specifically concerned with the production of a fluid impervious material comprising a fibrous material, particularly paper, in conjunction with scale wax and a critical amount of microcrystalline wax.

The present invention will be more fully appreciated by reference to the drawing illustrating one embodiment of the same. Referring specifically to the drawing, a waxy crude oil is introduced into distillation zone 1 by means of feed line 2. Temperature and pressure conditions in zone 1 are adapted to remove overhead by means of lines 3 and 4 to low boiling hydrocarbon fractions. A waxy distillate fraction is removed as a side stream by means of line 5, while a residual oil is removed by means of line 6.

The waxy distillate flows through a chilling zone 7 which may comprise a plurality of chilling stages wherein the temperature of the waxy distillate is progressively reduced. A typical operation is to introduce the feed oil into an initial chilling stage at a temperature of about 130° F.; to introduce the feed oil into the second chilling stage at a temperature of about 90° F.; to introduce the feed oil to the third chilling stage at a temperature of about 60° F.; to introduce the feed oil to the fourth chilling stage at a temperature of about 25° F. and to chill the same in the fourth chilling stage to a temperature in the range from about −10 to +10° F. The operation of the respective chilling stages may be varied appreciably and either direct or indirect chilling means utilized. For purposes of illustration, it is assumed that a solvent mixture is used and that the wax-precipitant comprises methyl-ethyl ketone and that the aromatic solvent having a high solubility for oil comprises toluene. It is also assumed that 3 to 4 volumes of total solvent mixture is utilized per volume of waxy oil being dewaxed. The solvent mixture comprises 75% by volume of methyl-ethyl ketone and 25% by volume of toluene.

The entire mixture comprising oily constituents, crystallized wax constituents, toluene and methyl-ethyl ketone, after chilling is held at the filtering temperature and passed to filtering zone 8 wherein the solid wax particles are segregated from the oily constituents by any suitable filtering or separation means. The filtering zone may comprise drum filters, plate and frame presses, centrifuges or suitable equivalent equipment for the separation of the precipitated waxy constituents from the oily constituents. The oil and a portion of the solvent is removed from zone 8 by means of line 9 and the wax cake washed with a wash solvent introduced into filtering zone 8 by means of line 10. Slack wax and solvent are removed from zone 8 by means of line 11 and passed to a distillation zone 12 wherein a separation is made between the wax and the solvent. It is to be understood that other means of separating the solvent from the wax may be utilized if desirable.

The wax substantially free of solvent is removed from separation zone 12 by means of line 13. The solvent mixture comprising methyl-ethyl ketone and toluene is removed overhead from zone 12 by means of line 14 and preferably recycled to the system. The oil-solvent mixture removed from filtering zone 8 by means of line 9 is introduced into a distillation zone wherein a separation is made between the oily constituents and the solvent mixture.

While the drawing illustrates a solvent dewaxing operation with respect to the production of the slack wax, it is to be understood that the waxy constituents may also be separated in a conventional plate-and-frame pressing operation. The slack wax may be then further refined to crude scale wax in zone 15, which comprises a conventional sweating operation, or solvent deoiling operation, or the like. The oil removed from zone 15 by means of line 36 may preferably be recycled to zone 7. The scale wax is removed from zone 15 by means of line 35 and may be further refined by treatment with sulfuric acid or fullers earth, bauxite or other absorbent materials, or by hydrogenation under mild treating conditions.

The residue is removed from distillation zone 1 by means of line 6 and passed into a deasphalting zone 16, wherein the asphaltic constituents are precipitated out using a deasphalting solvent, preferably propane which is introduced by means of line 50. The asphaltic constituents are removed by means of line 17, while the deasphalted oil and propane are removed by means of line 18 and passed to chilling zone 19 which may comprise a plurality of chilling zones. Additional propane may be introduced if needed by means of line 20. The chilled mass is passed to filtering zone 21 by means of line 22 wherein a separation is made between the oily constituents and the precipitated wax particles. A solvent-oil stream is removed by means of line 23 while the wax constituents are removed by means of line 24. While these waxy constituents may be utilized as such, it is preferred in order to reduce the concentration of the oil to add additional solvent such as propane by means of line 25 and to re-chill the mass in chilling zone 26. The solvent is removed from the precipitated wax particles in filter zone 27 and withdrawn by means of line 28. The waxy constituents are introduced to distillation or equivalent zone 29, wherein the remaining portions of the solvent are separated from the mircocrystalline wax. The solvent is removed by means of line 30 while the oil-free, solvent-free, microcrystalline wax is removed by means of line 31.

In accordance with the broad concept of the present invention, an improved wax composition having enhanced plastic properties is secured by the blending of the scale wax with the microcrystalline wax, is illustrated by a product removed by means of line 32. Also, in accordance with the specific concept of the present invention, this blend of microcrystalline and scale wax is heated in zone 33 and combined with a fibrous material introduced by means of line 34 to secure a fluid impervious shock resisting coated material.

While the drawing illustrates a sweating operation with respect to the production of the scale wax, it is to be understood that the waxy constituents segregated in zone 12 may be solvent deoiled in order to produce a satisfactory scale wax having an oil content below about 4%, perferably in the range from about 1% to 2.5% by weight.

The present invention may be more fully appreciated by the following examples illustrating the same:

EXAMPLE I

A number of wax blends were prepared comprising various percentages of microcrystalline wax. Various tests were conducted on these blends with the following results:

TABLE I

| | M. P., °F., ASTM | Oil content wt. Percent | Color [1] | Modulus of rupture, lbs/sq. in.[2] | Flexibility, 0.001″[2] | Impact strength, ft.-lbs.[2] |
|---|---|---|---|---|---|---|
| 131° F. ASTM Refined Wax | 131 | 0.5 | +30 S | 300 | 35 | 0.03 |
| +5% Petrolatum A | 131 | 0.9 | 18 TR | 530 | 70 | 0.05 |
| +12% Petrolatum A | 132 | 1.4 | 14 TR | 650 | 75 | 0.02 |
| +5% Petrolatum B | 131 | 0.6 | +4 S | 720 | 75 | 0.02 |
| +5% Petrolatum C | 131 | 0.8 | 18 TR | 630 | 70 | 0.01 |
| 124° F. ASTM White Scale Wax | 124 | 2.2 | +25 S | 170 | 45 | 0.10 |
| +5% Petrolatum A | 124 | 2.4 | 19 TR | 450 | 95 | 0.46 |
| +15% Petrolatum A | 125 | 3.1 | 15 TR | 640 | 195 | 0.50 |
| +5% Petrolatum B | 124 | 1.9 | +3 S | 590 | 100 | 0.65 |
| +5% Petrolatum C | 124 | 2.2 | 18 TR | 470 | 95 | 0.54 |

[1] S: Saybolt color; TR: Tag-Robinson color.
[2] Tests conducted at 40° F.

From the above it is apparent that the addition of the microcrystalline wax improved the properties of the scale wax.

Also, the scale-microcrystalline wax blends had a much higher resistance to impact and were more flexible than the paraffin-microcrystalline wax blends, or than the crude scale wax alone. Both of these properties are highly desirable in waxes used for coating packages of paperboard, particularly for packages stored under refrigeration, such as milk cartons or frozen food packages. Whereas the addition of microcrystalline wax to refined paraffin in most cases reduced resistance to impact or increased it only slightly, if at all, the addition of microcrystalline wax to scale wax invariably increased resistance to impact. The modulus of rupture of the scale-micro blends, while not so high as that of equivalent paraffin blends, was still sufficiently high to insure excellent performance for package coating. Although flexibility of refined wax is increased a small amount by the addition of microcrystalline, the flexibility of scale wax is increased much more.

EXAMPLE II

The effectiveness of the wax blend of the present invention as a milk carton coating composition in comparison with a typical commercial coating wax and a refined wax with the addition of microcrystalline wax is shown by the following data. These results were obtained on typical commerical milk cartons coated on a commercial machine with the experimental waxes. Coating temperatures were varied within about 20° F. to give approximately equal wax consumption values, since the amount of wax coating on a carton is known to affect the percentage leakers.

TABLE II

| Wax | Commercial Blended Coating Wax | Scale +5 Percent Petrolatum | Scale +10 Percent Petrolatum | Refined Wax +2 Percent Petrolatum |
|---|---|---|---|---|
| Wax consumption, lbs./1,000 cartons. | 34 to 35 | 34 to 35 | 34 to 35 | 34 to 35. |
| Percent leakers [1] | 71 | 50 | 25 | 69. |

[1] Cartons are filled with water (colored with methylene blue dye) stored at 40° F. for 16 hours, then dropped, in a standard manner, on one corner. Cartons are then stored for 24 hours and number of leaking cartons counted. Result expressed as number of leakers out of 100 cartons tested.

The cartons coated with the scale-petrolatum blends showed greatly improved durability (lower percent leakers) as compared with cartons coated with a commercial blended milk carton wax and with a refined wax-petrolatum blend. Only 25 to 50% of these cartons developed leaks in the durability test as compared with about 70% leakers for the other products. Other properties of the cartons, such as resistance to liquid penetration, appearance, and rigidity, which are important to most users, were at least as good, or better, with the scale wax-microwax blends.

EXAMPLE III

The increased flexibility and impact strength of scale wax-microcrystalline wax blends as compared with refined wax-microcrystalline wax blends cannot be attributed solely to the higher oil content of the former, since the addition of oil to a refined wax-microcrystalline wax blend does not result in the same properties exhibited by the scale wax-microcrystalline wax blend. This is shown in the table below:

into strips which are placed on a smooth brass plate and cooled to 40° F. in a cold room for 16 hours. The wax strips are broken by placing them horizontally across two parallel ¼-inch rods, and loading by running water into a bucket suspended from the center of the wax strip. The total weight required to break each strip is measured in grams. The average of six determinations, 3 air-cooled side up and 3 water-cooled side up, is reported as "modulus of rupture," and calculated from the following formula:

$$\text{M. R. } 40° \text{ F.} = \frac{\text{grams} \times 0.00463}{\text{width} \times \text{thickness}^2} = \text{lbs./sq. in.}$$

Paraffin flexibility test

This test measures the distance in thousandths of an inch through which a wax strip, 0.070" thick may be bent before breaking when displaced transversely at a distance of one inch from the secured end. The test is carried out at 40° F. Two wax discs, one about 0.05" thick and one about 0.09" thick, are prepared in a similar manner to the discs prepared in the "Modulus of rupture" test and similarly cut into 6 strips, each 3" by .5". A wax strip is broken by holding one end firmly in a vise in a vertical position and displacing the strip with a micrometer at a distance of one inch from the vise jaws until the first sign of a crack appears in the strip. Micrometer extension is recorded and thickness of each specimen measured.

Six samples are broken for each thickness, 3 broken air-cooled side facing micrometer and 3 water-cooled side facing the micrometer. Displacement for a 0.070" thick specimen is obtained by interpolation (log-log plot) between the average displacement of the 0.05" and the 0.09" specimen. This interpolated value, expressed in thousandths of an inch, is reported as "flexibility."

TABLE III

| | Melting point, °F., ASTM | Oil content, wt. Percent | Modulus of rupture, lbs./sq. in. at 40° F. | Flexibility at 40° F., 0.001" | Impact strength, ft.-lbs., at 40° F. |
|---|---|---|---|---|---|
| Scale Wax-Microcrystalline Wax Blend (White Scale +5% Petrolatum) | 124 | 1.9 | 590 | 100 | 0.65 |
| Refined Wax-Microcrystalline Wax Blend (Refined Wax +5% Petrolatum) | 131 | 0.6 | 590 | 65 | 0.01 |
| +1% Oil | | 1.6 | 550 | 70 | 0.01 |
| +2% Oil | | 2.6 | 440 | 80 | 0.03 |
| Scale alone (used in above blend) | 124 | 2.2 | 170 | 45 | 0.10 |
| Refined wax (used in above blend) | 131 | 0.5 | 300 | 35 | 0.03 |
| Lower melting point Refined Wax alone | 122 | 0.1 | 600 | 35 | 0.25 |

It is evident from the above data that the flexibility and impact strength of scale wax-microcrystalline wax blends are greatly superior to refined wax-microcrystalline wax-oil blends. Even when as much as 2% oil is added, these properties are only very little improved. It is also evident from the above data that the improved properties of scale-microcrystalline wax blends is not due to the lower melting point of the scale wax. The greatly improved properties are apparently due to the fact that scale waxes contain desirable constituents which provide these very desirable properties of a coating wax and which properties are not found to such a high degree in refined wax.

In the above tables, the terms "Modulus of rupture," "Flexibility," and "Impact strength," were determined in the following manner:

Modulus of rupture test

This test is adapted to measure the stress required to break a bar of wax 0.15" thick and 0.50" wide when a load is applied at the center of a span 1.4" wide. The test is carried out at 40° F. Wax discs, 0.15" thick, are cast by pouring a weighed sample of wax on the surface of boiling distilled water in a crystallizing dish and allowed to cool for 2 to 3 hours. These discs are then cut

Impact strength test

This test measures the force in foot-pounds required to crack a test specimen 0.05 to 0.06 inch thick and is carried out at 40° F. by dropping "hammers" of known weights on the test specimen. Two wax discs, each 0.05" to 0.06" thick prepared as in the above tests are cut into squares 1½" on a side and placed on a smooth brass plate and cooled to 40° F. for 16 hours. The samples are removed and held under water at 40° F. ± 1° F. for one-half hour. Hammers are dropped on a contact rod placed on the wax specimens (air-side up) which are supported on a smooth steel plate. One determination per specimen is made until the lowest height at which cracking occurs consistently is bracketed. The product of this height times weight of hammer is reported as "impact strength."

EXAMPLE IV

Additional tests were conducted to determine criticality of the amount of the microcrystalline wax used in conjunction with the scale wax and to further show the difference between scale wax-microcrystalline wax blends and paraffin wax-microcrystalline wax blends. The results of these tests are as follows:

DAIRY WAX EVALUATION

| Wax | Commercial Blended Coating Wax | 124 M. P. White Scale Wax Plus— | | | | | 130 M. P. Paraffin Wax Plus— | |
|---|---|---|---|---|---|---|---|---|
| | | 5% Micro | 10% Micro | 15% Micro | 20% Micro | 25% Micro | 5% Micro | 10% Micro |
| Wax Consumption, lbs./1,000 cartons | 32–35 | 32–35 | 32–35 | 32–35 | 32–35 | 32–35 | 32–35 | 32–35 |
| Coating temp., °F | 187 | 181 | 200 | 210 | 220 | 226 | 190 | 205 |
| Percent leakers [1] | 71 | 50 | 19 | 28 | 30 | 28 | 52 | 32 |
| 40° F. Storage:[2] | | | | | | | | |
| Acid absorption, lbs./1,000 cartons | 8.5 | 7.0 | 6.0 | 6.0 | 8.5 | 11.0 | 7.0 | 8.0 |
| Bulge, 1/32 in | 2 | 2½ | 2 | 2 | 3 | 5½ | 2½ | 2½ |
| 73° F. Storage:[2] | | | | | | | | |
| Acid absorption, lbs./1,000 cartons | 16.5 | 12.5 | 7.5 | 14.5 | 12.0 | 12.0 | 9 | 9 |
| Bulge, 1/32 in | 4 | 7 | 4 | 8 | 8½ | 9 | 4 | 5 |

[1] Cartons are filled with water (colored with methylene blue dye) stored at 40° F. for 16 hours, then dropped, in a standard manner on one corner. Cartons are then stored for 24 hours and the number of leaking cartons counted. The result is expressed as number of leakers out of 100 cartons tested.
[2] Cartons are filled with a 1% solution of lactic acid in water (colored with methylene blue dye) then stored for 72 hours. 10 cartons stored at 40° F. and 10 cartons stored at 73° F. After storage the weight of fluid absorbed and the increase in bulge is determined.

It is evident from these data that there is a critical amount of microcrystalline wax which, when blended with the scale wax, gives best results, both from a durability and appearance standpoint. It is also evident that the scale wax-microcrystalline wax blends are superior, when considering all desirable properties, than the paraffin wax blends containing equivalent amounts of microcrystalline wax.

What is claimed is:

An improved two-component film-forming wax composition for coating paperboard or the like, consisting essentially of scale wax containing from about 1% to 4% of oil and about 10% of microcrystalline wax having a melting point between 145° F. and 180° F.

References Cited in the file of this patent
UNITED STATES PATENTS

| | | |
|---|---|---|
| 2,056,894 | Bretschger | Oct. 6, 1936 |
| 2,102,516 | Coster | Dec. 14, 1937 |
| 2,299,951 | Ingle | Oct. 27, 1942 |
| 2,361,582 | Adams et al. | Oct. 31, 1944 |
| 2,443,221 | Bergstein | June 15, 1948 |
| 2,541,006 | Porter et al. | Feb. 6, 1951 |
| 2,546,328 | Arabian et al. | Mar. 27, 1951 |
| 2,583,938 | French | Jan. 29, 1952 |

OTHER REFERENCES

Commercial Waxes, Bennett, Chemical Publishing Co. Inc., Brooklyn, New York, 1944, pages 56 and 295.

Warth's "The Chemistry & Technology of Waxes," New York, 1947.